(12) United States Patent  
Serota

(10) Patent No.: US 9,042,948 B2  
(45) Date of Patent: *May 26, 2015

(54) HEADSET WITH BINARY DISPLAY AND INTEGRATED COMPUTING SYSTEM

(71) Applicant: Virtual Goggles Inc., Oswego, IL (US)

(72) Inventor: Lee Serota, Oswego, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/573,713

(22) Filed: Dec. 17, 2014

(65) Prior Publication Data

US 2015/0102983 A1  Apr. 16, 2015

Related U.S. Application Data

(63) Continuation of application No. 14/480,384, filed as application No. PCT/US2013/025784 on Feb. 12, 2013, and a continuation of application No. 13/603,216, filed on Sep. 4, 2012, now Pat. No. 8,577,427.

(60) Provisional application No. 61/608,307, filed on Mar. 8, 2012, provisional application No. 61/645,303, filed on May 10, 2012, provisional application No. 61/906,915, filed on Nov. 21, 2013.

(51) Int. Cl.
*H04M 1/00* (2006.01)
*G02B 27/01* (2006.01)
*H04R 1/10* (2006.01)

(52) U.S. Cl.
CPC ............ *G02B 27/0176* (2013.01); *H04R 1/105* (2013.01); *G02B 27/0179* (2013.01); *H04R 2499/15* (2013.01); *H04R 2201/109* (2013.01); *G02B 2027/0178* (2013.01)

(58) Field of Classification Search
CPC . G02B 27/017; G02B 2027/014; G02B 27/01
USPC ............ 455/575.2, 575.1, 550.1, 8; 379/430; D14/204, 372, 233; 381/74, 376
See application file for complete search history.

(56) References Cited

U.S. PATENT DOCUMENTS

| | | | | |
|---|---|---|---|---|
| 6,157,291 | A * | 12/2000 | Kuenster et al. | 345/8 |
| 6,378,390 | B2 * | 4/2002 | Saito | 74/159 |
| 6,496,161 | B1 * | 12/2002 | Tanaka | 345/8 |
| 8,577,427 | B2 * | 11/2013 | Serota | 455/575.2 |
| 2010/0259471 | A1 * | 10/2010 | Takano et al. | 345/156 |
| 2010/0295754 | A1 * | 11/2010 | Cernasov et al. | 345/8 |
| 2010/0328204 | A1 * | 12/2010 | Edwards et al. | 345/157 |

OTHER PUBLICATIONS

U.S. Appl. No. 14/480,395, filed Jan. 2015, Serota, Lee.*

* cited by examiner

*Primary Examiner* — Nay A Maung  
*Assistant Examiner* — Angelica M Perez

(57) ABSTRACT

The adjustable headset is an all in one device that includes an adjustable support band, a display system, a first and second ear cover, a computer system, a communications system, and a power source. The adjustable support band connects to each ear cover, with the ear covers being adjacent to a user's ears. The display system uses binary screens to create the experience of looking at large screens by taking up most of a user's field of view. The display system is attached to the ear covers by adjustable screen bars, which allow a user to change the general orientation of the display system. The computer system is capable of storing and running software programs and interfacing with connected devices by means of a set of connection ports or the communications system. The virtual goggles can adjust to meet individual comfort needs and interface with a variety of technologies.

20 Claims, 14 Drawing Sheets

US 9,042,948 B2

HEADSET WITH BINARY DISPLAY AND INTEGRATED COMPUTING SYSTEM

The current application is a continuation of U.S. Utility patent application Ser. No. 14/480,384 filed Sep. 8, 2014, which is a 371 of international PCT Application Number PCT/US13/25784 filed on Feb. 12, 2013, which is a continuation in part of U.S. Utility patent application Ser. No. 13/603, 216 filed Sep. 4, 2012, claims benefit of U.S. Provisional Patent Application No. 61/645,303 filed May 10, 2012, and claims benefit of U.S. Provisional Patent Application No. 61/608,307 filed Mar. 8, 2012. The U.S. Utility patent application Ser. No. 14/480,384 filed Sep. 8, 2014 further claims benefit of U.S. Provisional Patent Application No. 61/906, 915 filed Nov. 21, 2013.

FIELD OF THE INVENTION

The present invention relates generally to a headset with two proximal displays for simulating a single large display.

BACKGROUND OF THE INVENTION

There are currently many devices, including headgear, which incorporate computer functionality. These devices take many forms, from helmets to goggles and glasses, essentially providing users with portable, lightweight, and convenient systems. Others provide enhanced viewing experience for multimedia, whether playing games or watching movies. However, while current products provide specific features, many of them are narrow in focus. Some current solutions are meant purely for movies and video, lacking the capability to be used for productivity. Some devices are capable of playing games, but only in the sense that they connect to a dedicated console; the devices themselves only serve as displays and are incapable of independently running and displaying games. There are even some solutions which are very narrow in scope, being integrated into medical devices or helmets, displaying video from a camera or providing wireless communication methods, such as radio. They are only capable of limited functions, or restricted in regards to the devices they can interact with. It is therefore an object of the present invention to provide a computerized headgear which is capable of connecting to a variety of devices, as well as providing multimedia, computing, and accessory functions. It is a further object of the present invention to serve as an all-in-one device capable of serving as an entertainment platform, office tool, and more.

The present invention combines basic computer capabilities with an advanced display and multimedia environment. Numerous connection methods and tertiary features are included to ensure the present invention is a useful product regardless of the situation and location users may find themselves.

DETAIL DESCRIPTIONS OF THE INVENTION

All illustrations of the drawings are for the purpose of describing selected versions of the present invention and are not intended to limit the scope of the present invention.

Figure 1:
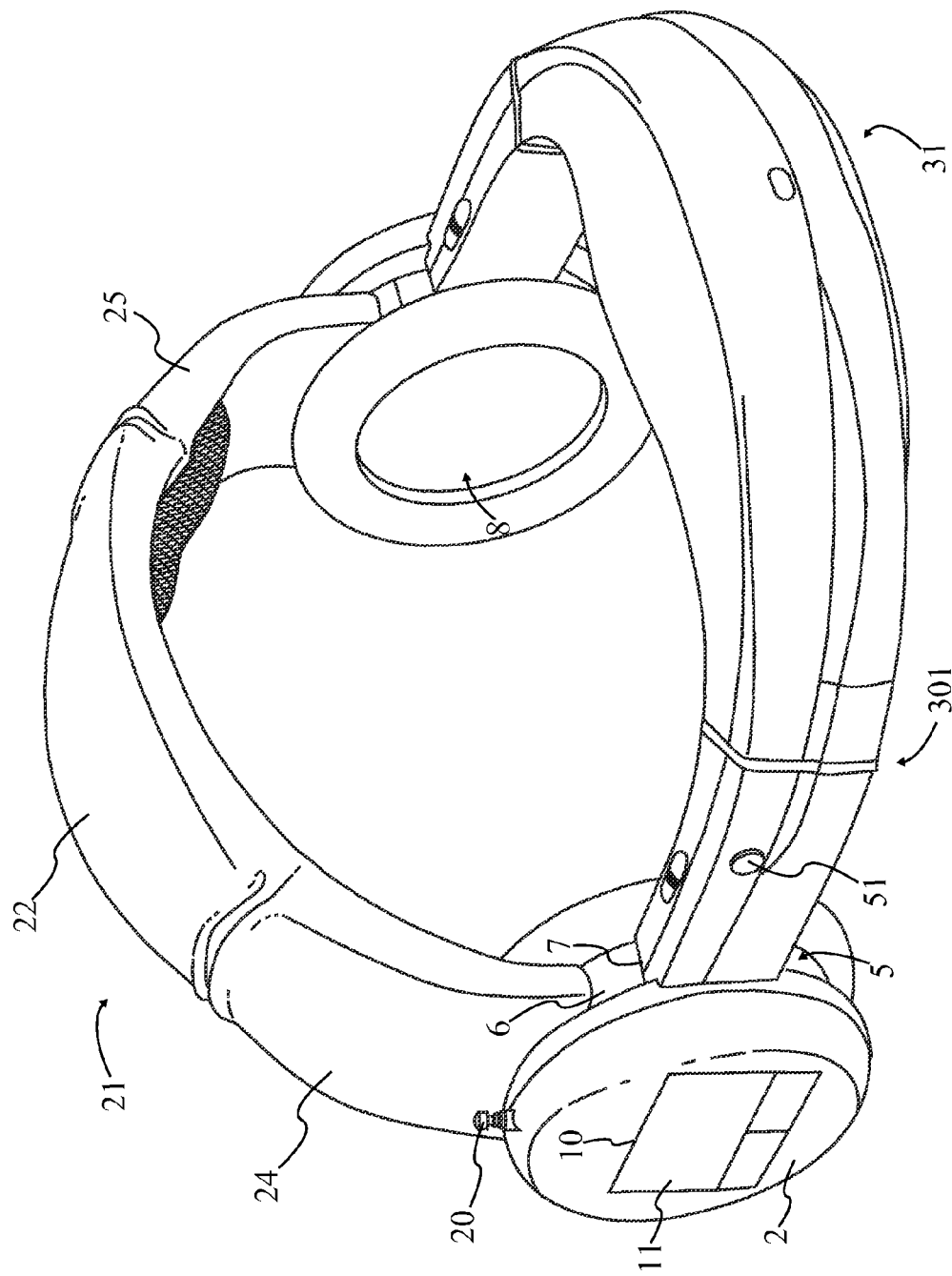
FIG. 1 is a perspective view of the present invention.
Figure 2:
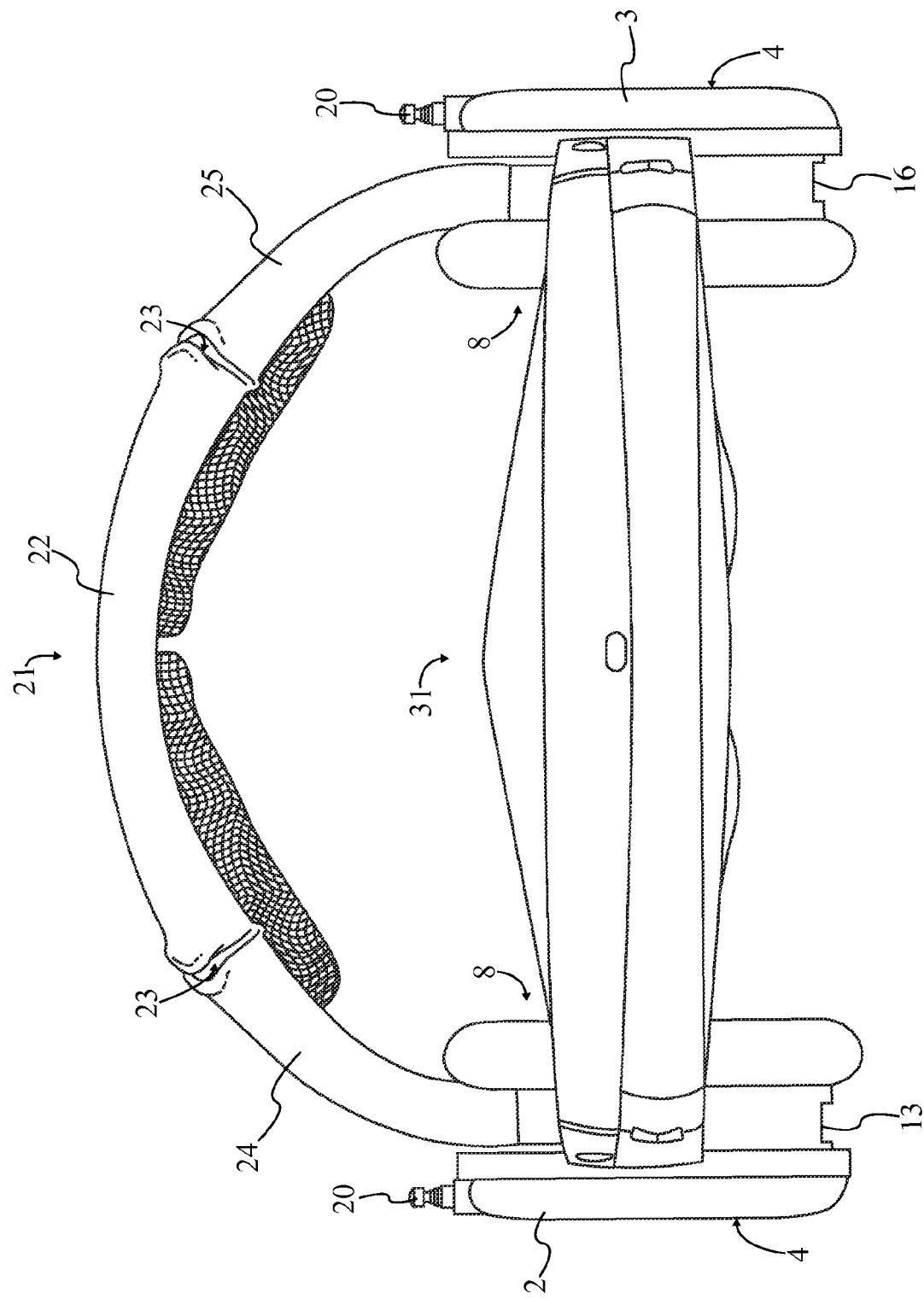
FIG. 2 is a front view of the perspective invention.
Figure 3:
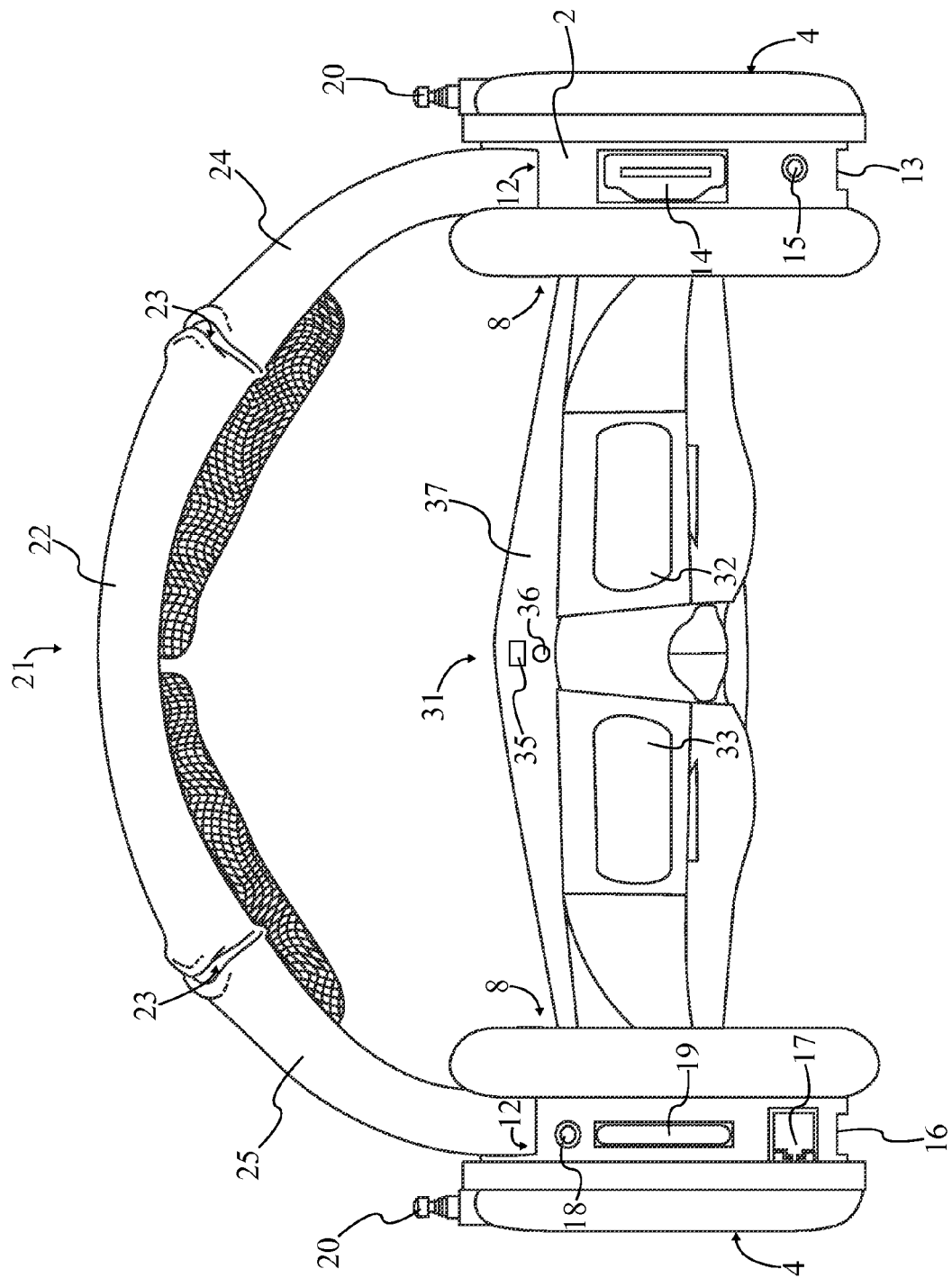
FIG. 3 is a rear view of the present invention.
Figure 4:
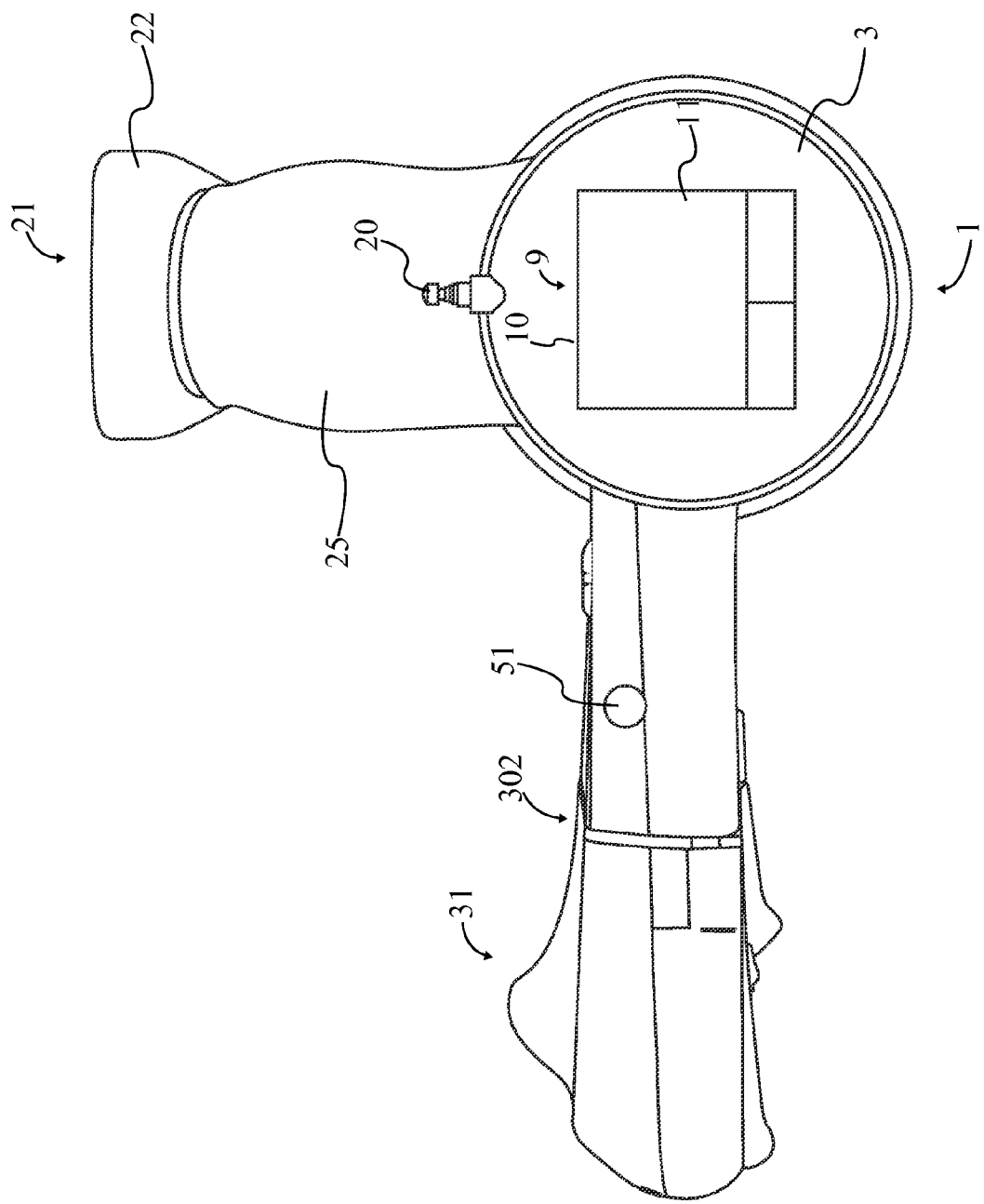
FIG. 4 is a right view of the present invention.
Figure 5:
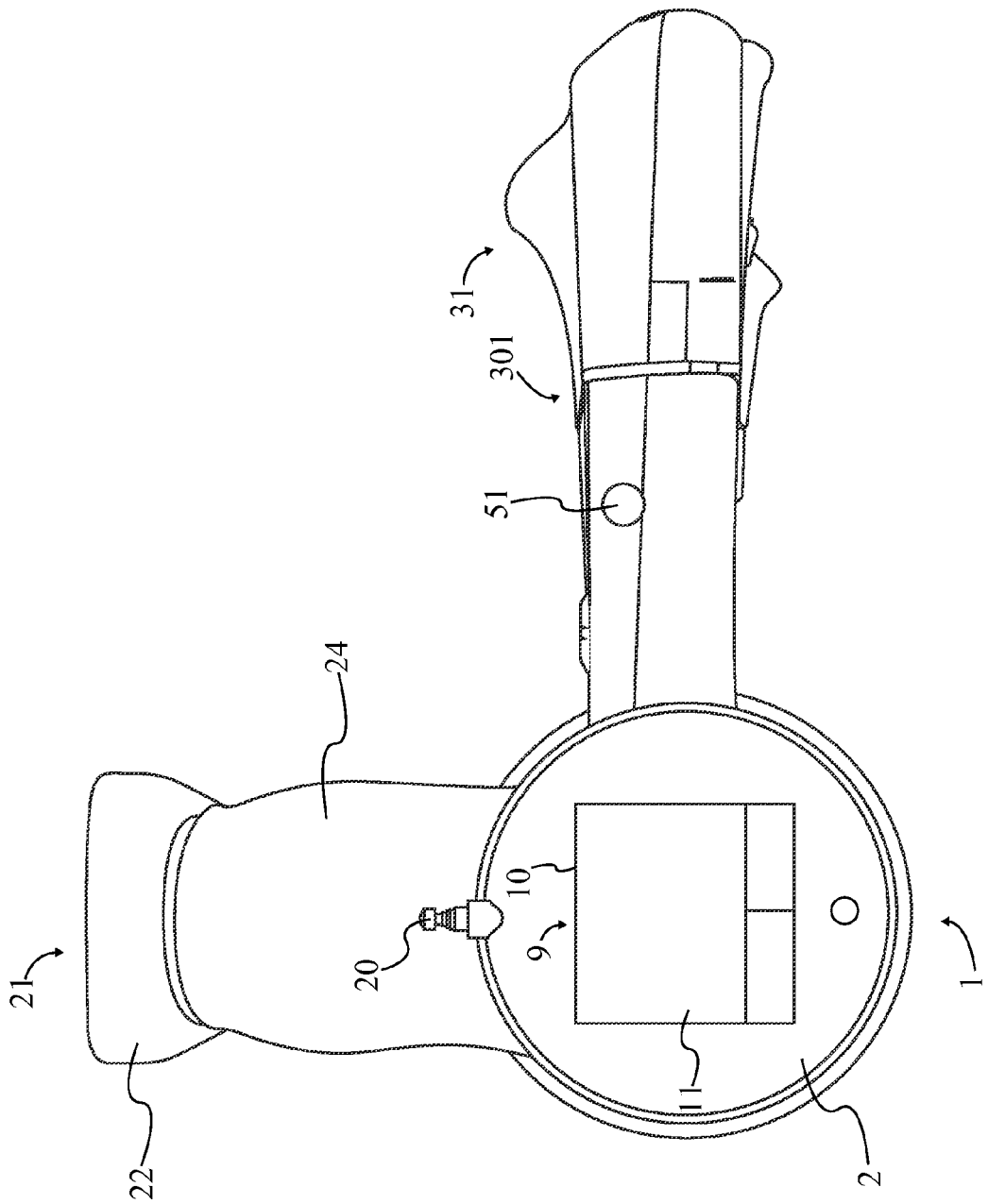
FIG. 5 is a left view of the present invention.
Figure 6:
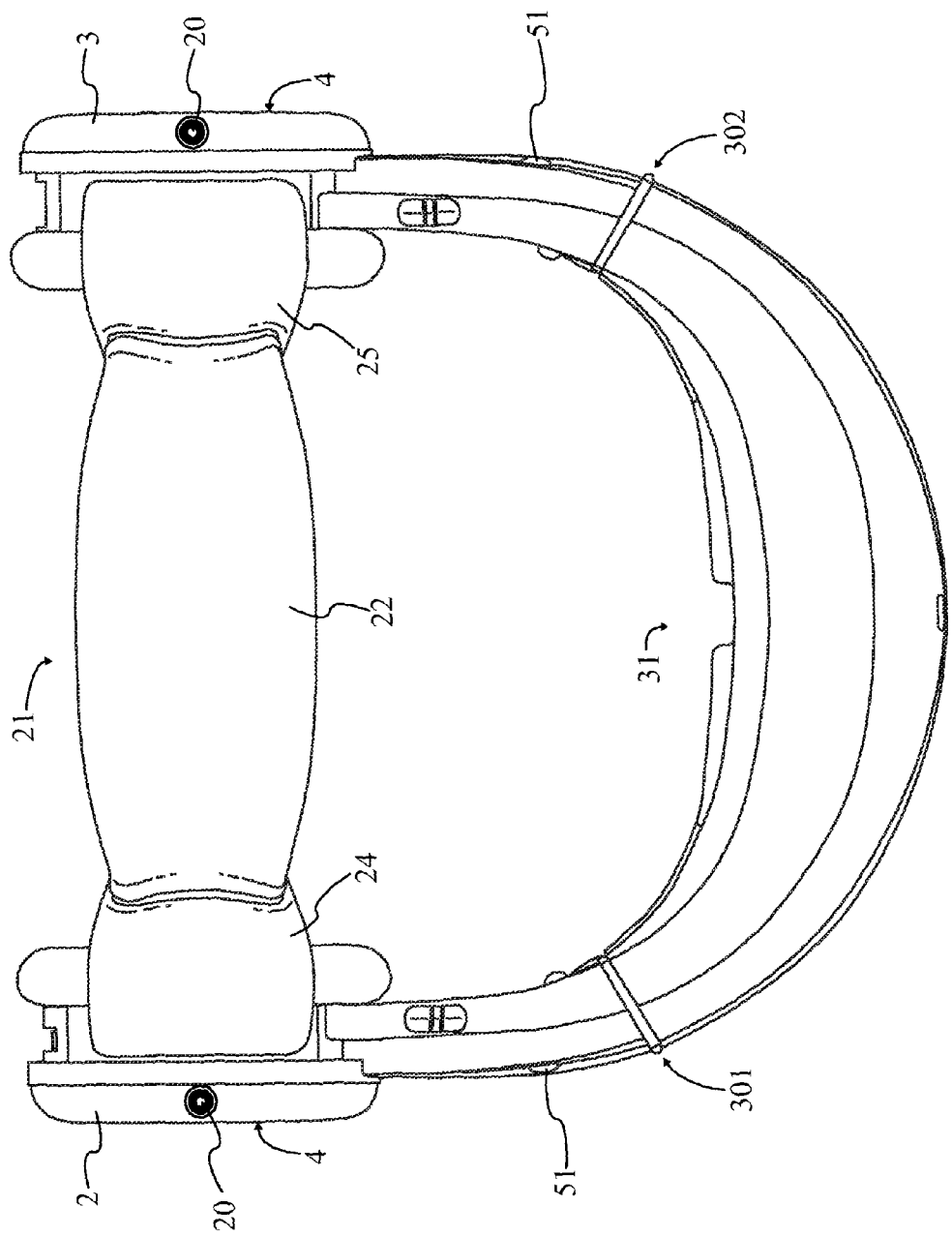
FIG. 6 is a top view of the present invention.
Figure 7:
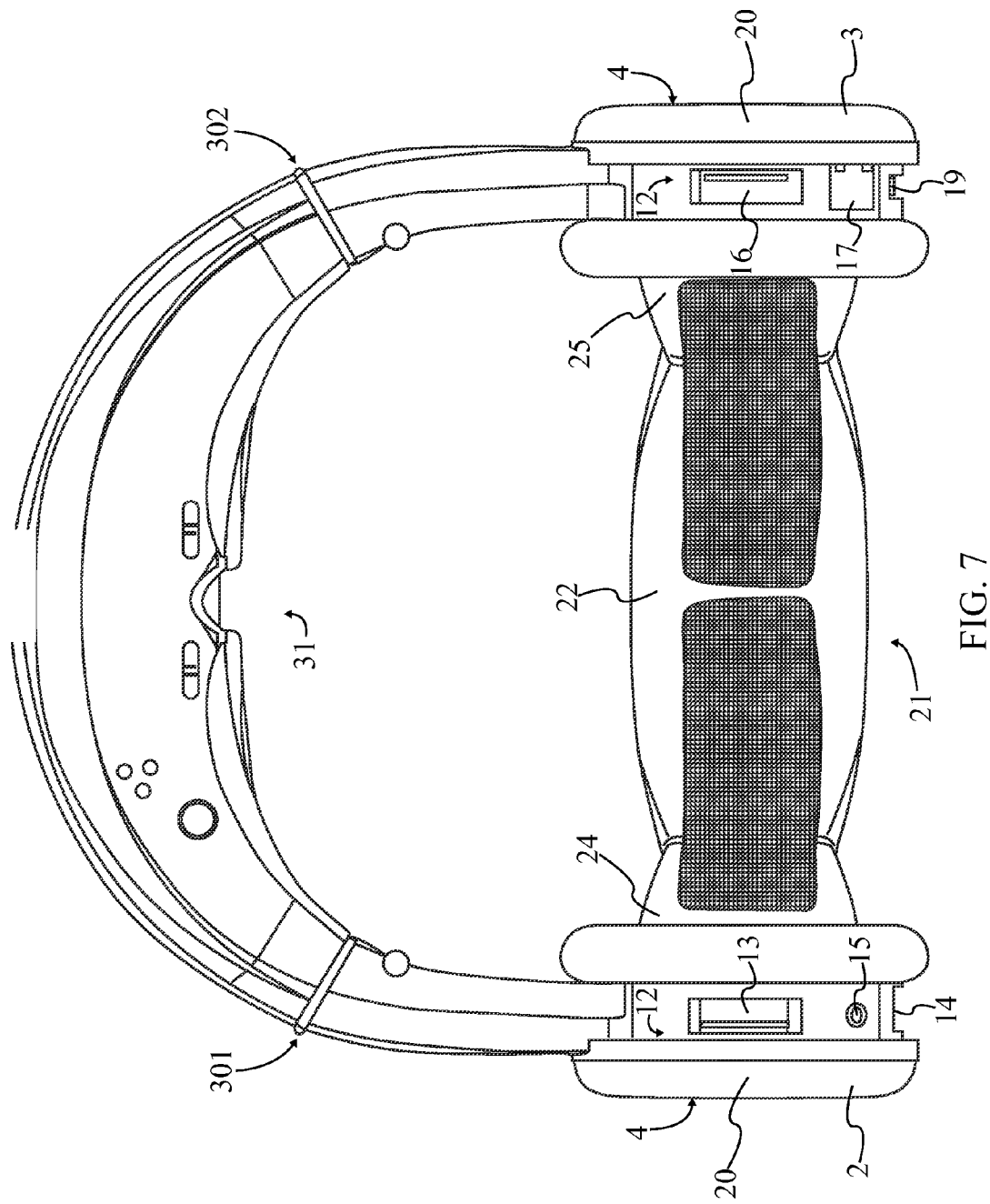
FIG. 7 is a bottom view of the present invention.
Figure 8:
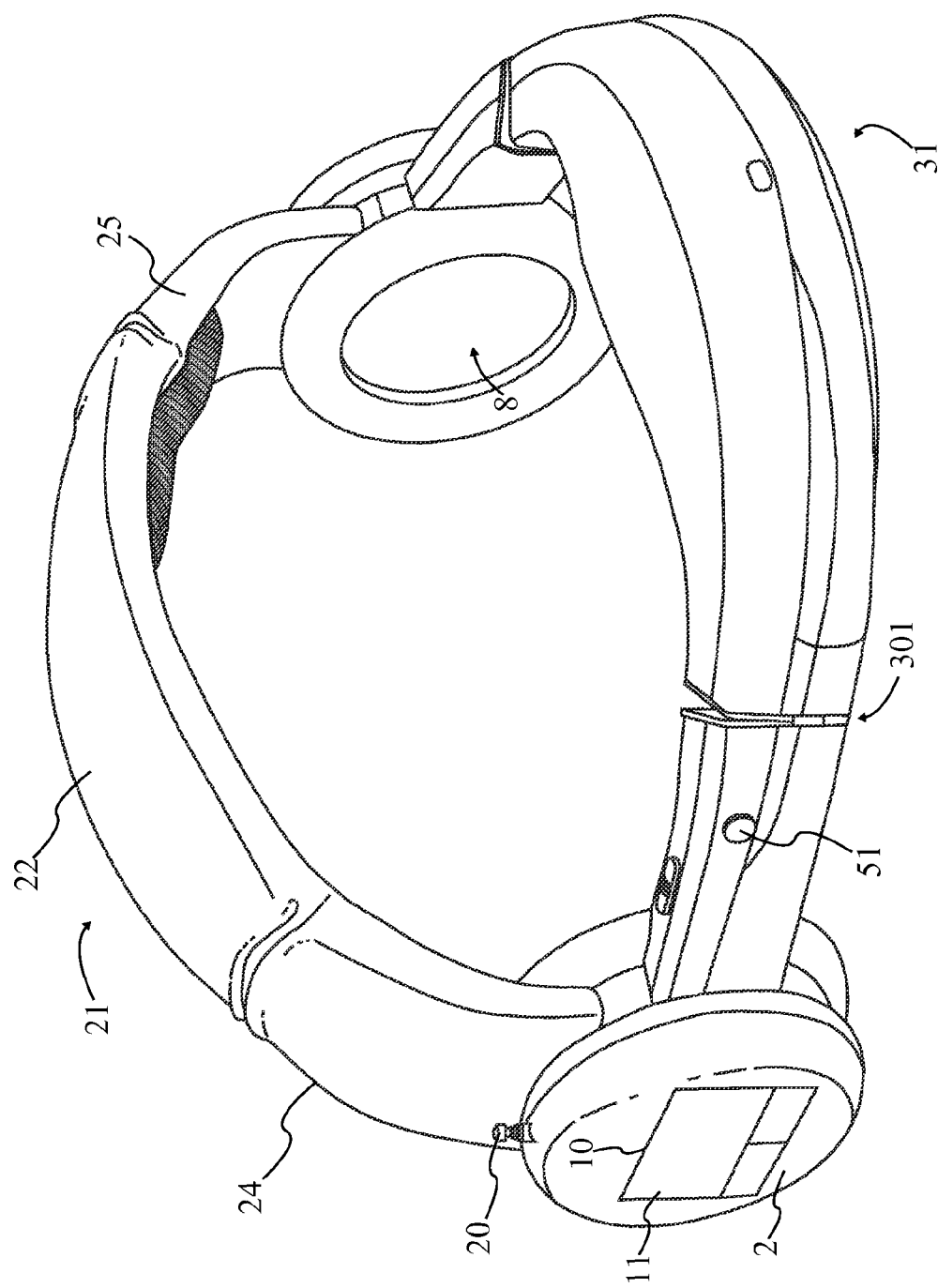
FIG. 8 is a perspective view of the present invention in an expanded configuration.
Figure 9:
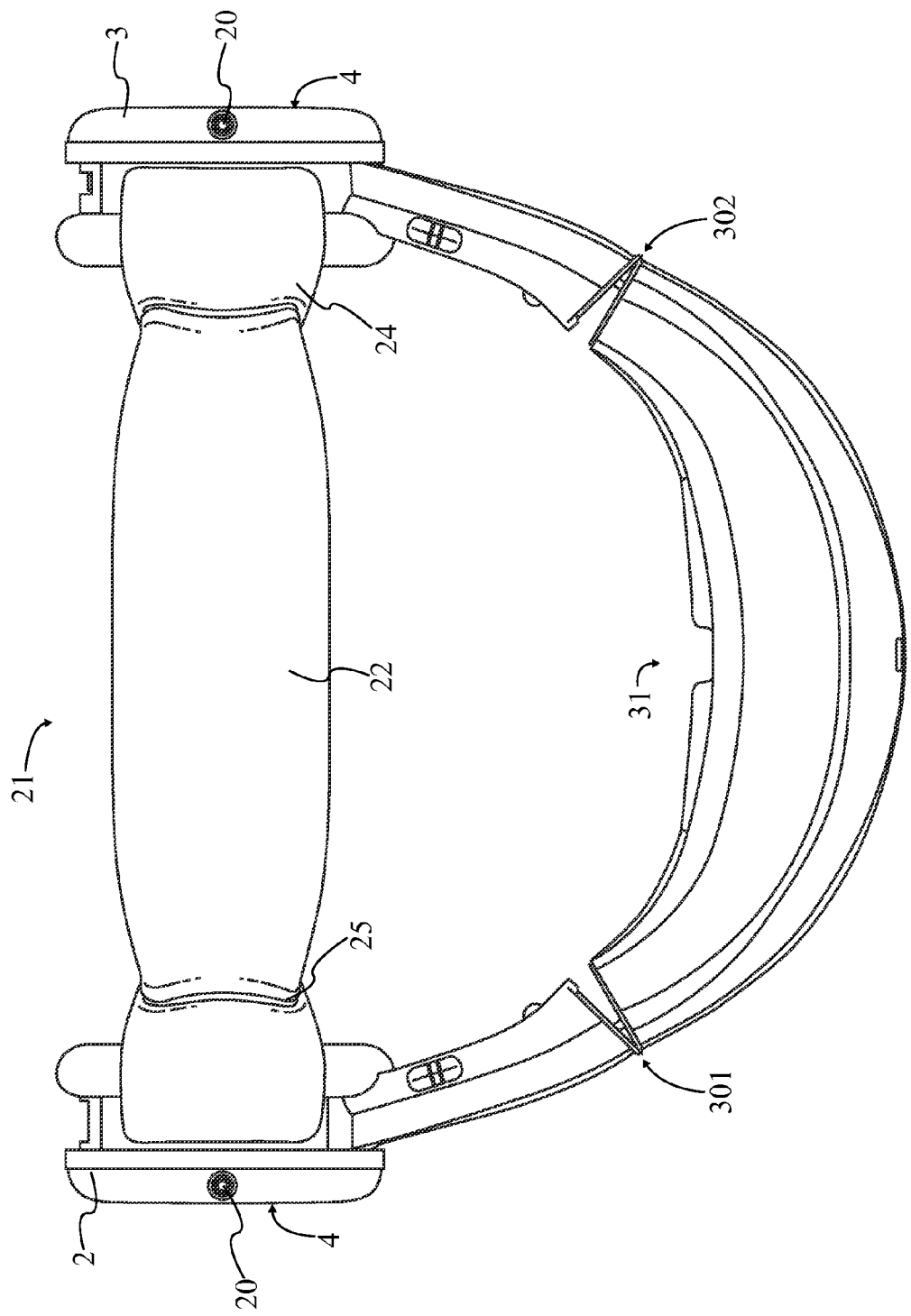
FIG. 9 is a top view of the present invention in an expanded configuration.
Figure 10:
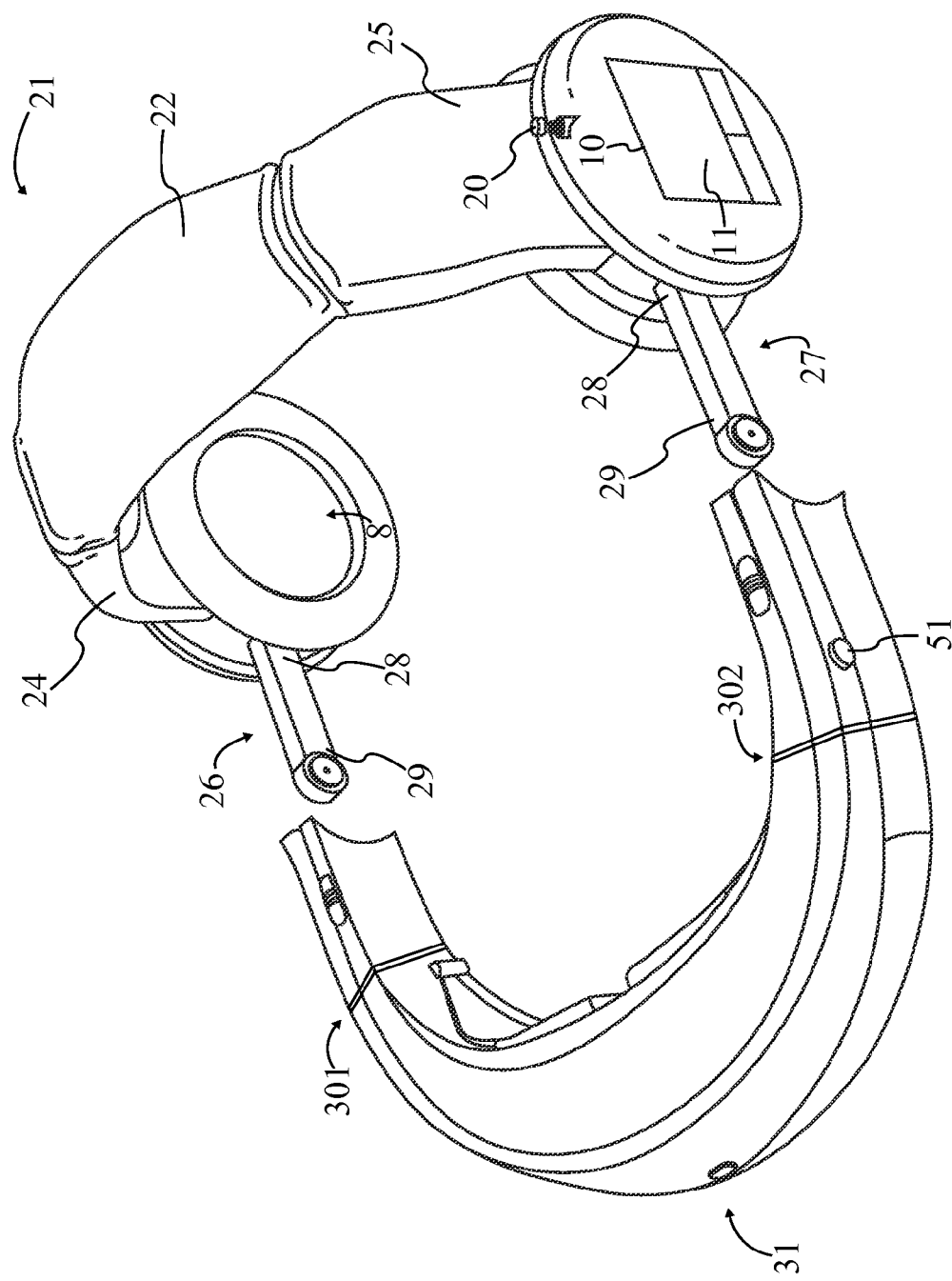
FIG. 10 is a perspective view of the present invention in a detached configuration.
Figure 11:
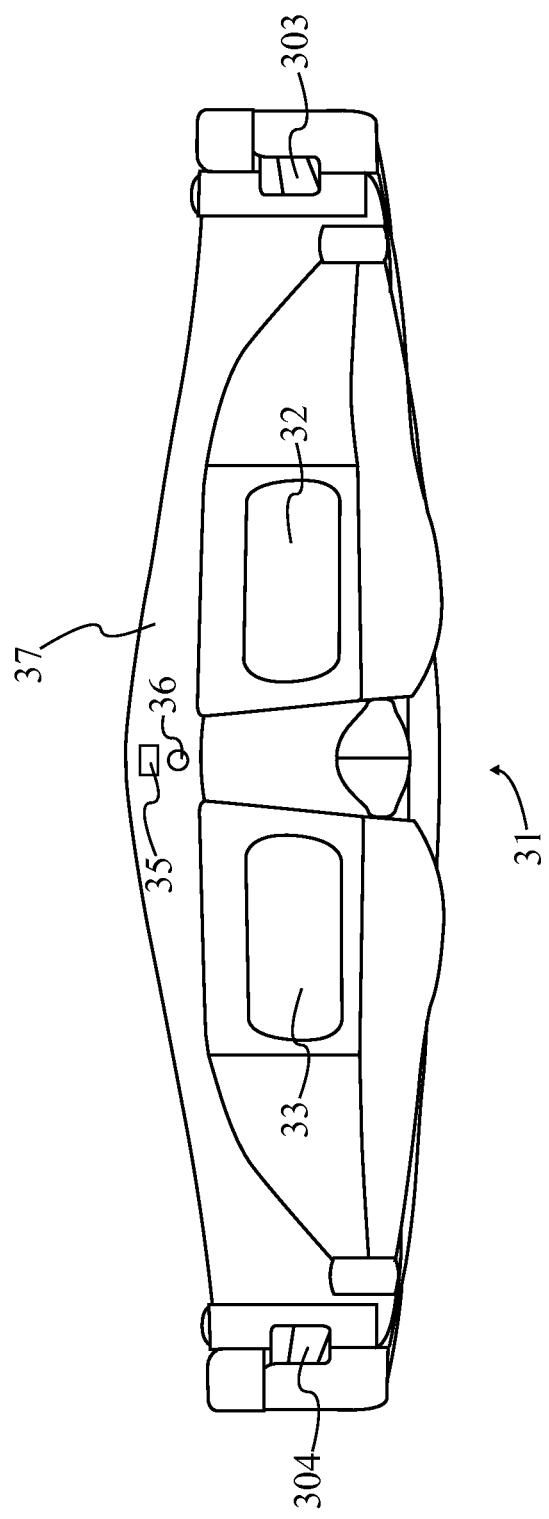
FIG. 11 is a rear view of a display system of the present invention in a detached configuration.
Figure 12:
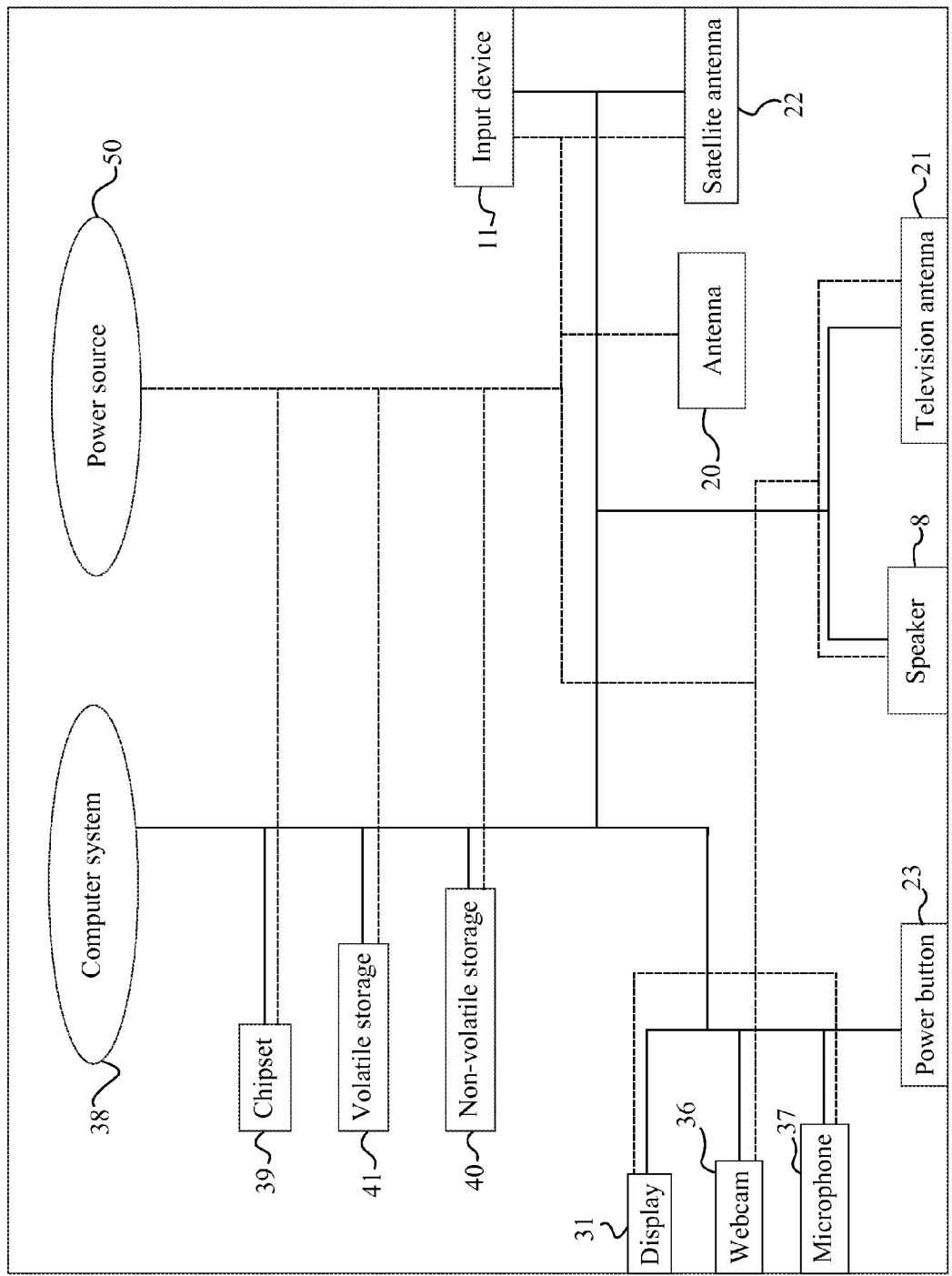
FIG. 12 is a graphic showing electrical and electronic connections of the present invention.
Figure 13:
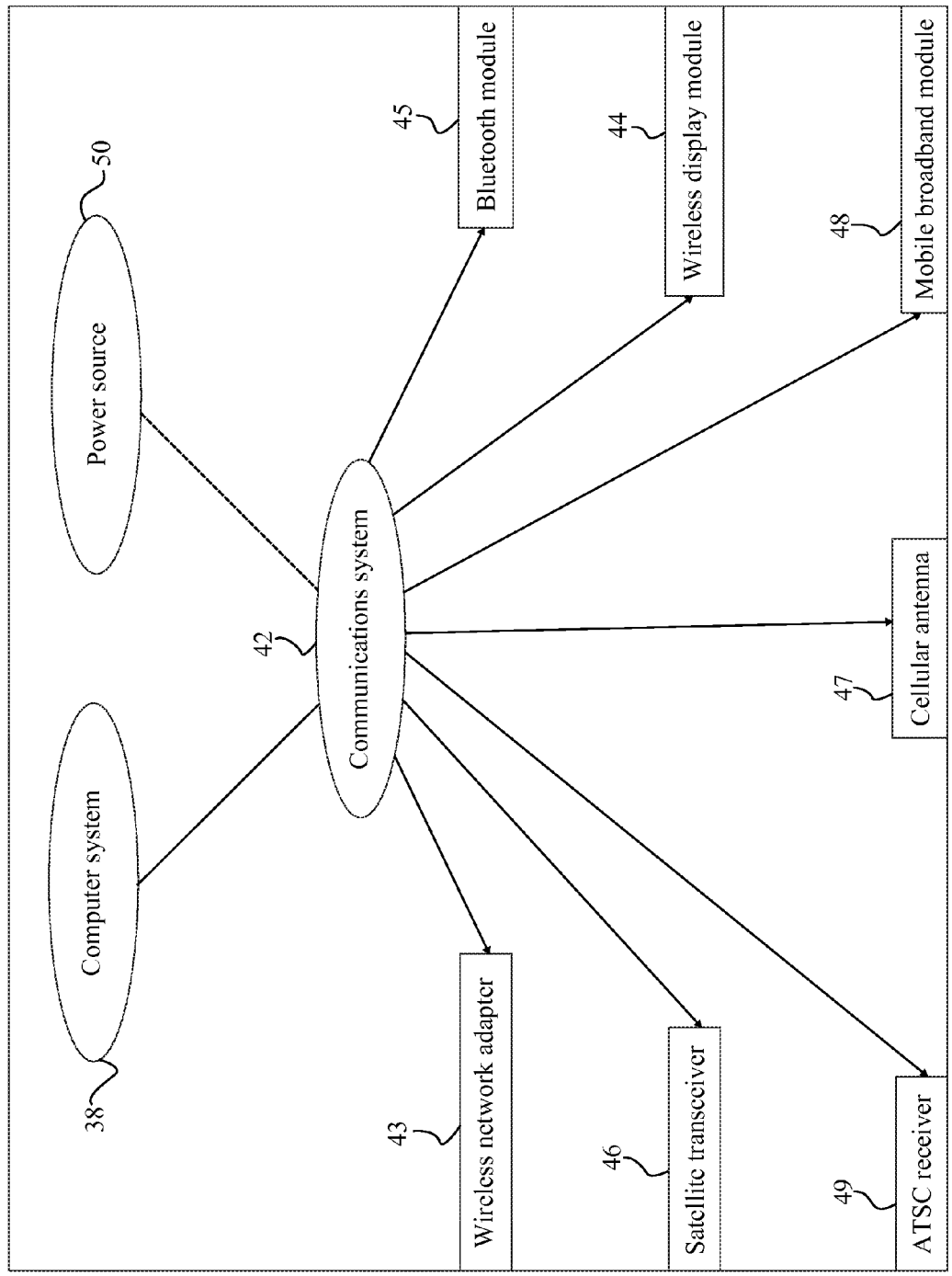
FIG. 13 is another graphic showing electrical and electronic connections of the present invention.
Figure 14:
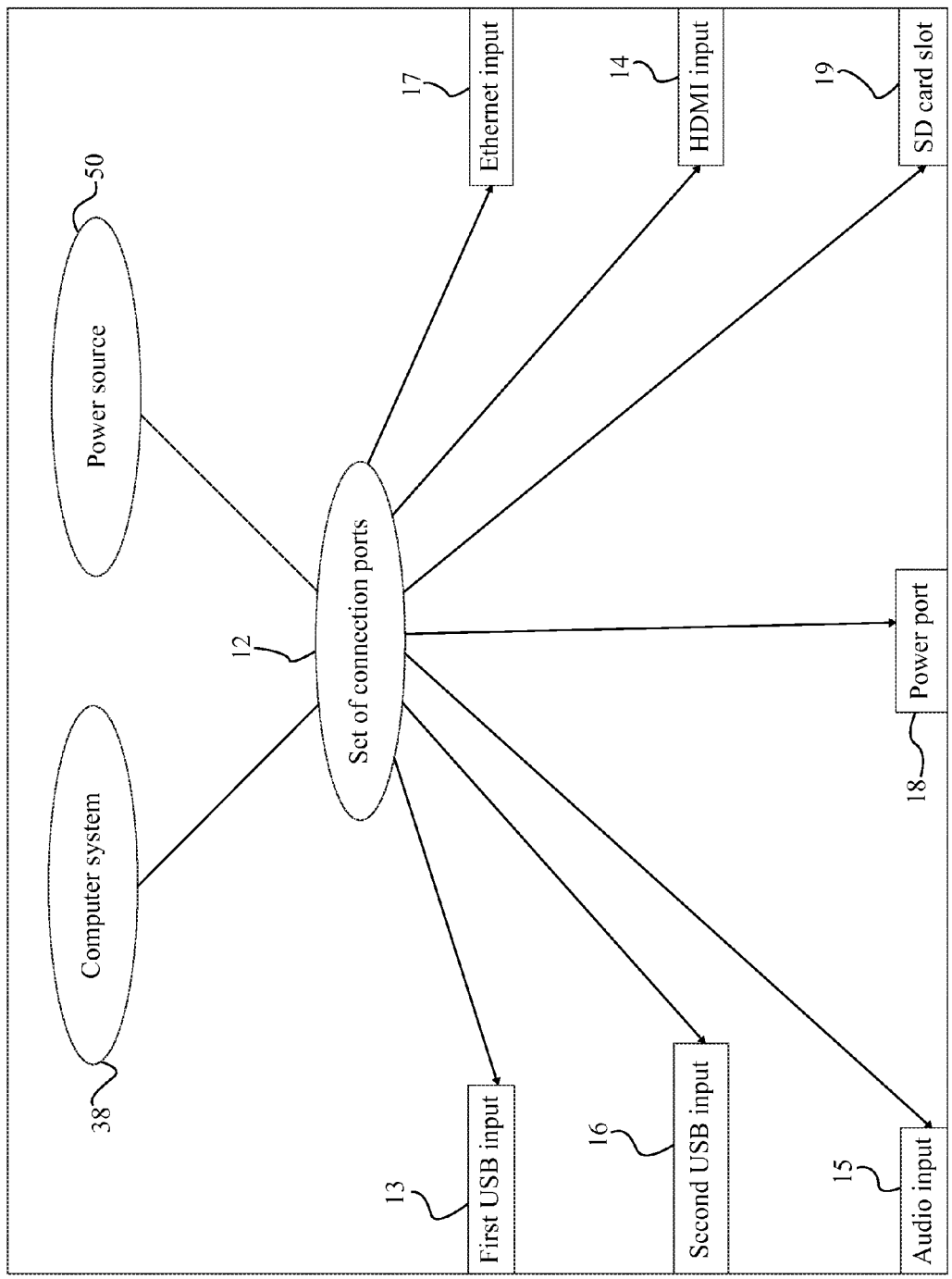
FIG. 14 is another graphic showing electrical and electronic connections of the present invention.

The present invention is a computerized display system 31 built into headgear. The present invention comprises a pair of ear covers 1, an expandable support band 21, a first screen bar 26, a second screen bar 27, a display system 31, a computer system 38, a communications system 42, and a power source 50. The expandable support band 21 connects the first ear cover 2 and the second ear cover 3, allowing the expandable support band 21 to rest atop a user's head while the first ear cover 2 and second ear cover 3 rest against a user's ears. The first screen bar 26 is connected to the first ear cover 2, while the second screen bar 27 is connected to the second ear cover 3. The first screen bar 26 and second screen bar 27 are extendable. In addition, the first screen bar 26 and the second screen bar 27 can be rotated in relation to the first ear cover 2 and second ear cover 3. The display system 31 is connected to the first screen bar 26 and the second screen bar 27, such that movement of the first screen bar 26 and the second screen bar 27 results in corresponding movement of the display system 31. For example, the screen bars can extended or retracted to help adapt the present invention to individual variations in physical features. Similarly, rotation of the screen bars allows the display system 31 to be rotated out of a user's field of view, allowing them to still wear the present invention during ambulatory activities or while performing tasks which require visual attention. The computer system 38, communications system 42, and power source 50 are all contained with the present invention, with individual subcomponents housed within the first ear cover 2 or second ear cover 3. The power source 50 provides sufficient power to run the display system 31, computer system 38, and communications system 42, as well as any auxiliary devices included. The computer system 38 is connected to the display system 31 and communications system 42, allowing the computer system 38 to output a visual interface, as well as any relevant information, to the display system 31. A notable aspect of the present invention is the display system 31, which provides specific display screens for each eye. By providing display screens for each eye, the display system 31 is capable of simulating screen sizes much larger than its physical size, offering an improvement to traditional single-screen solutions currently used for computerized headgear. The present invention and its constituent components are illustrated via FIG. 1-FIG. 7. The present invention is shown in an expanded configuration via FIG. 8 and FIG. 9, as well as a detached configuration in FIG. 10 and FIG. 11. Electronic and electrical aspects are outlined in FIG. 12-FIG. 14.

The pair of ear covers 1 comprises a first ear cover 2 and a second ear cover 3. The first ear cover 2 and second ear cover 3 each comprise an enclosure 4, an annular screen rail 5, a speaker 8, a control interface 9, a set of connection ports 12, and an antenna 20. The enclosure 4 preferably has a cylindrical shape, being wide enough to cover an ear. The speaker 8 is located on an interior face of the enclosure 4, where it would be adjacent to a user's ear while the present invention is being worn. The speaker 8s also include a padding around the speaker 8 perimeter to cushion a user's ear against the ear covers and to increase user comfort. On an exterior face, opposite the speaker 8, is where the control interface 9 is positioned. The control interface 9 allows a user to interact with the present invention while wearing it, simply by using a free hand to send commands through the control interface 9. The control interface 9 comprises an input housing 10 and an input device 11. The input housing 10 is recessed into the enclosure 4 and holds the input device 11. The input device 11 is preferably a touchpad with mouse buttons, similar to that used with laptops. In addition, it is preferable that the input device 11 can be removed from the input housing 10 and used remotely, sending commands to the computer system 38 by means of the communications system 42. The annular screen rail 5 is positioned on the annular face of the enclosure 4 and comprises a track 6 and guide slider 7. The guide slider 7 is restrained to the track 6, but is free to move along the track 6. The guide slider 7 (of the first ear cover 2 and the second ear cover 3) serves as a connection point for the first screen bar 26 and second screen bar 27 (respectively), allowing the angle between the expandable support band 21 and the first screen bar 26 and second screen bar 27 to be adjusted. This allows a user to rotate the first screen bar 26 and second screen bar 27 such that the expandable support band 21 is either above or behind a user's head. The antenna 20 is rotatably connected to the enclosure 4, allowing it to be adjusted to provide better reception as necessary. Preferably, the antenna 20 is also telescoping, such that it may be extended to improve reception or retracted to increase the visual appeal of the current invention.

The set of connection ports 12 on the first ear cover 2 comprises a first Universal Serial Bus (USB) input 13, a High-Definition Multimedia Interface (HDMI) input 14, and an audio input 15. The set of connection ports 12 on the second ear cover 3 comprises a second USB input 16, an Ethernet input 17, a power port 18, and a Secure Digital (SD) card slot 19. Each set of connection ports 12 is powered by the power source 50 and in communication with the computer system 38, allowing the present invention to make use of external accessories like flash drives, printers, and external displays such as monitors. The antenna 20 of the first ear cover 2 is preferably a television antenna 20, allowing the present invention to receive television broadcasts, while the antenna 20 of the second ear cover 3 is preferably a satellite antenna 20 allowing the present invention to receive satellite signals. The enclosures 4 are protected by a waterproof coating, such as polyurea, to help prevent water from leaking into and damaging the electronic components.

In other embodiments the annular screen rail 5 could instead be connected to the expandable support band 21, resulting in the first screen bar 26 and second screen bar 27 being fixed while the expandable support band 21 can be rotated around the pair of ear covers 1. It is also possible for the speakers 8 to be positioned away from a user's ears, rather than adjacent to said ears. However, this would likely decrease user comfort and also allow other persons in proximity to hear sound from the speakers 8, reducing privacy of the user. Other possible alterations include allowing the first ear cover 2 and second ear cover 3 where they connect to the expandable support band 21. This would allow the first ear cover 2 and second ear cover 3 to rotate until they are flat, such that the speaker 8 could rest on a flat surface like a table. This would allow the ear covers to serve as stands for the present invention, letting a user interact with the present invention even while not wearing it.

The expandable support band 21 is worn on the head, supporting the present invention on a user's head as well as securing the first ear cover 2 to the second ear cover 3. The expandable support band 21 comprises a main section 23, a first end section 24, and a second end section 25. The main section 23 comprises a main rail 23, which is internal to the main section 23. The main rail 23 runs the length of the main section 23, protruding from a first end and second end of the main section 23. The main rail 23 inserts to the first end section 24 and second end section 25, connecting the first end section 24 to the first end of the main section 23. Similarly, the main rail 23 connects the second end section 25 to the second end of the main section 23. In this manner the first end section 24 and second end section 25 may be moved closer to or away from the main section 23, simply by sliding along the main rail 23. This allows a user to alter the length of the expandable support band 21 to better support their individual head size. The expandable support band 21 also helps to secure the other components of the present invention; the first ear cover 2 is attached to the first end section 24 opposite the main section 23 just as the second ear cover 3 is attached to the second end section 25 opposite the main section 23. The main section 23, first end section 24, and second end section 25 each include padding on a bottom surface. The padding serves as a soft layer between the expandable support band 21 and a user's head, increasing user comfort. The main section 23, first end section 24, and second end section 25 each also include a waterproof coating over an exterior upper surface. This waterproof coating can be made from a variety of materials, such as polyurea, and serves to repel water and help protect internal components, especially electrical components, from water damage. As discussed, this configuration of the expandable support band 21 allows a user to expand or contract portions of the present invention; in this manner the present invention is able to accommodate individual variations in head shape and width.

In other embodiments the expandable support band 21 may use an adjustment method other than the main rail 23 system. For example, the first end section 24 and second end section 25 could be connected to the main section 23 by a compressible material, similar to the bellows of an accordion. Another possible addition is the inclusion of intermediate sections. These intermediate sections could provide finer adjustments to the curve of the expandable support band 21. The first end section 24 and second end section 25 could also be rotatably attached to the first ear cover 2 and second ear cover 3, respectively, allowing the expandable support band 21 to rotate just as the screen is capably of rotating.

The first screen bar 26 and the second screen bar 27 each comprise a support end 28 and a screen end 29. The screen end 29 serves as an attachment point for the display system 31 and is potentially capable of sliding into the support end 28. By sliding the screen end 29 into or out of the support end 28, a user can adjust the distance of the display system 31 in relation to their face. The display system 31 could be moved closer for watching multimedia or other applications where an immersive environment is desirable, while the display system 31 could be moved away for office work or similar situations, where it would be beneficial to be able to see papers on a desk by simply glancing down rather than having to remove or flip the display system 31. The support end 28 connects to the guide slide on the annular screen rail 5, allowing the first screen bar 26 and second screen bar 27 (and as a result, the display system 31 itself), to be move along the track 6. As the expandable support band 21 can be increased or decreased in width, the connection between the screen bars and the display system 31 must be flexible; a rigid connection would prevent a user from adjusting the expandable support band 21. Thus, a first hinge 301 and a second hinge 302 are positioned at opposite ends along the display system 31, adjacent to a respective first screen bar 26 and second screen bar 27. The hinges allow the ends of the display system 31 to rotate with respect to the main portion. This effectively allows the display system to "expand" along with the expandable support band 21. Thus, the display system 31, hinges, and expandable support band 21 allow a user to expand or contract the width of the present invention to accommodate their personal features.

In other embodiments the first screen bar 26 and second screen bar 27 could include an auxiliary support to assist the adjustable support band. This auxiliary support could be applied in a variety of manners, such as a chin strap that is connected to the support end 28 of the first screen bar 26 and to the support end 28 of the second screen bar 27. A nose bridge could also be connected to the first screen bar 26 and second screen bar 27, acting in a similar manner as does the bridge in glasses, although care must be taken so that the bridge does not interfere with the view of a user. The first screen bar 26 and second screen bar 27 could include additions for purposes other than added support. A side cover, taking the form of removable plates or a simple curtain, could be attached to the first screen bar 26 and the second screen bar 27 rail. These covers would serve to reduce the amount of light reaching a user and improve the user's experience when watching movies or engaging in similarly immersive applications.

The display system 31 comprises a first display device 32, a second display device 33, a webcam 35, and a microphone 36. The first display device 32 and second display device 33 are provided for corresponding eyes of a user; by utilizing a display device for each eye, the present invention is capable of simulating a large field of view compared. This contrasts with prior art where only a single screen is used, in which effective screen size is ultimately limited by physical constraints of the headgear; it is impractical for a person to wear a headgear that supports a twenty four inch (or similarly unwieldy) display. A protective cover 34 is provided for both the first display device 32 and the second display device 33. The protective cover 34 for the first display device 32 is attached across the first display device 32 while the protective cover 34 for the second display device 33 is attached across the second display device 33. In the preferred embodiment the protective cover 34 is a transparent static antiray cover that provides protection against user headaches without impeding a user's view of the corresponding display device. The first display device 32 and second display device 33 effectively combine to create a "high definition" resolution, defined as a minimum of 1920 pixels in width and 1080 pixels in height. Furthermore, the first display device 32 and second display device are capable of auto stereoscopic three-dimensional display. The first display device 32 and second display device 33 are positioned adjacent to each other, in alignment with a user's eyes. When the display system 31 is moved next to a user's face (e.g. by means of the rail system), the first display device 32 and second display device 33 provide the experience of viewing a large screen, in line with home and theater displays, despite the relatively small size of the display system 31. In order to allow a user to view the first display device 32 and second display device 33, the display device are positioned on an concave interior face 37 of the display system 31. The webcam 35 and microphone 36 provide a user with additional means of interaction, allowing video and audio to be captured and transmitted to other parties. The webcam 35 and microphone 36 are positioned on the concave interior face 37 of the display system 31 in order to provide higher quality video and audio capture. The webcam 35 and microphone 36 are also centered on the concave interior face 37, positioned between the first display device 32 and the second display device 33. This allows the webcam 35 to more easily capture a user's face and positions the microphone 36 closer to a user's mouth in order to improve audio pickup. Preferably, the webcam 35 and microphone 36 are recessed into the concave interior face 37 such that they help provide a cleaner aesthetic nature for the present invention. This positioning also helps to reduce bulk of the display system 31, compared to an embodiment where the webcam 35 and microphone 36 are extended from the interior concave surface. Expanding upon the electrical connection of the display system 31 with the power source 50, the power source 50 is electrically connected to the first display device 32, second display device 33, webcam 35, and microphone 36. Similarly, to allow communication with other components of the present invention, the display system 31 and its first display device 32, second display device 33, webcam 35, and microphone 36 are each electronically connected to the computer system 38.

To allow the display system 31 to be detached from the main body of the present invention, the display system 31 further comprises a first receptacle 303 and a second receptacle 304. These receptacles are cavities in the body of the display system, designed to receive a corresponding first screen bar 26 and second screen bar 27. More specifically, the first screen bar 26 traverses into the first receptacle 303 while the second screen bar 27 similarly traverses into the second receptacle 304. The display system is secured in place by the locking mechanisms 51, which couple the first screen bar 26 with the first receptacle 303 and the second screen bar 27 with the second receptacle 304. The locking mechanisms 51 can be disengaged to allow movement of the screen bars with relation to the receptacles. Disengaging the locking mechanism 51 (e.g. by pressing a button) ultimately enables a user to detach the display system 31 from the main body, whether for replacement or other purposes. A variety of subsystems can be implemented for the locking mechanism 51, examples of which include but are not limited to detents, latches, and clamps.

In other embodiments the first display device 32 and second display device 33 could utilize smaller or larger resolutions, or use stereoscopic methods to display three-dimensional media. Potentially, the display system 31 can be made removable, allowing it to be replaced with a separate consumer device, though this would likely require a device specific adapter to ensure compatibility between the large number of aftermarket devices and the present invention. The adapter ideally affords the added device the same movement capabilities as the stock display system 31, as well as allows the added device to make use of the computer system 38 and communications system 42 of the present invention, or simply using those available in the added device if that is preferred, and assuming the device is capable.

To enhance the user experience in relation to the display system 31, funnel extensions could be connected to the first display device 32 and the second display device 33, positioned adjacent to the concave interior face 37. These funnel extensions serve to prevent exterior light from reaching the first display device 32 and second display device 33, further enhancing the user's experience of looking at a large screen. These funnel extensions can be implemented in a variety of ways, e.g. a tube that runs from a respective display device to the corresponding eye. The funnel extensions preferably utilize ergonomic contours at a free end, opposite the display device, allowing the funnel extensions to conform to a user's ocular-related facial structure without becoming uncomfortable. Furthermore, padding may be provided to mitigate potential discomfort that might otherwise be experienced.

The computer system 38 comprises a chipset 39, a non-volatile storage 40, and a volatile storage 41. The chipset 39 can run instructions, allowing the present invention to utilize software and operating systems. The non-volatile storage 40 allows the present invention to install an operating system and software programs. The volatile storage 41 allows the present invention to use programs at faster speeds. In the preferred embodiment, the non-volatile storage 40 will utilize NAND flash while the volatile storage 41 will use random access memory, preferably DDR3 SDRAM. In combination, these three components allow the present invention to effectively run an operating system (such as Android™) and other programs. The computer system 38 is in communication with all other electronic devices of the system, including the communications system 42, set of inputs, display system 31, and antenna 20s. This allows the computer system 38 to interact with all other components as well as output information, such as a visual interface, to the screen. The computer system 38 is preferably housed with either the first ear cover 2 or the second ear cover 3, although it could also be split across both if desired.

In other embodiments the computer system 38 could include additional specialized components. For example, the computer system 38 could include a dedicated graphics or sound module, to provide better quality video and audio to users. However, such additions come at the price of increased power usage and may not provide a significant enough increase in performance to justify the higher power requirements. Ideally, the preferred computer system 38 will be capable of performing basic tasks such as video playback and word processing.

The communications system 42 comprises a wireless network adapter 43, a wireless display module 44, a Bluetooth module 45, a satellite transceiver 46, a cellular antenna 47, a mobile broadband module 48, and an Advanced Television Systems Committee (ATSC) receiver 49. The ATSC receiver 49 communicates with the television antenna 20 of the first ear cover 2, allowing the present invention to play certain television broadcasts picked up by the television antenna 20. Likewise, the satellite transceiver 46 communicates with the satellite antenna 20 of the second ear cover 3, allowing the present invention to send and receive information over satellite networks, enabling the use of features such as GPS. The wireless network adapter 43 allows the present invention to connect to nearby networks (generally 802.11, as well as devices connected to those networks), while the Bluetooth module 45 allows other Bluetooth enabled devices, such as some console controllers, remotes, and smart phones, to interface with the present invention. The wireless display module 44 allows the present invention to output information to a compatible external display, such as a television; this feature can be replicated using the HDMI connection if a compatible external display is not available. The cellular antenna 47 allows the present invention to operate over cell networks, while the embedded mobile broadband module 48 allows the present invention to utilize the broadband internet access provided by cellular companies, such as 3G. The mobile broadband module 48 provides a larger area of network coverage, useful if there are no proximal wireless networks. As with the computer system 38, the communications system 42 can be housed with the first ear cover 2, the second ear cover 3, or split between both. Ideally the ATSC receiver 49 will be positioned adjacent to the television antenna 20, house within the first ear cover 2. Likewise, the satellite transceiver 46 will be housed within the second ear cover 3, adjacent to the satellite antenna 20.

In other embodiments a variety of accessory devices could enhance the functionality of the present invention. One potential accessory device is a controller that can be communicably coupled to the display system 31, making games and other programs easier to use with the present invention. Potentially, a laser keyboard could be positioned on the exterior side of the display system 31 or on the first screen bar 26 or second screen bar 27. The laser keyboard would create a virtual keyboard on a flat surface, allowing a user to type with the present invention without the need to carry around a keyboard. An interior light could be positioned on the interior side of the display system 31, first screen bar 26, or second screen bar 27 and used to provide interior lighting when the present invention is in use. Additionally, an exterior light could be positioned on the exterior side of the display system 31. The exterior light would allow a user to better see their surroundings when using the present invention in low light conditions, such as during a nighttime stroll. An exterior camera system, including a front exterior camera and a rear exterior camera, could also be added. The front exterior camera would face away from the present invention, in a forward or backwards direction. The exterior cameras would then allow a user to see video footage from their front and backsides, outputting footage to the display. The front exterior camera could allow a user to continue using the present invention while mobile, navigating obstacles by viewing the feed from the front exterior camera. The exterior cameras could also be given low-light or thermal viewing capabilities, allowing the cameras to be used in a wider variety of situations. As well as providing video capabilities, the exterior cameras would function as regular cameras, being capable of taking pictures. Another possible addition is a security device to limit access to the present invention. The security device could be a thumbprint reader or utilize a more intricate method, such as retinal scans. Other possible inclusions include power indicators and temperature sensors. In general a wide variety of accessory devices can be added to enhance the utility of the present invention without interfering with the intended function.

In the future the present invention will also be able to make use of new standards and technologies as they develop. For example, cell phone communications standards have evolved from 3G, to 4G, and eventually new standards such as 5G will be introduced. Visual and audio technologies are also advancing, with the concept of 5D recently having been introduced. As these and other new technologies develop, the present invention will be able to incorporate them as well as the necessary components.

Although the invention has been explained in relation to its preferred embodiment, it is to be understood that many other possible modifications and variations can be made without departing from the spirit and scope of the invention as hereinafter claimed.

What is claimed is:

1. A headset with binary display and integrated computing system comprises:
   a pair of ear covers comprises a first ear cover and a second ear cover;
   the first ear cover and second ear cover each comprise an enclosure, an annular screen rail, a speaker, a control interface, and a set of connection ports;

the speaker being positioned on the enclosure opposite the control interface;
the annular screen rail being positioned on the enclosure between the speaker and the control interface;
the annular screen rail being positioned around the enclosure;
the set of connection ports being positioned on the enclosure adjacent to the annular screen rail around the enclosure;
the annular screen rail comprises a track and a guide slider;
the guide slider being movably engaged with the track;
a first screen bar and a second screen bar;
the first screen bar and the second screen bar each comprise a support end and a screen end;
the support end of the first screen bar being connected to the guide slider of the first ear cover;
the support end of the second screen bar being connected to the guide slider of the second ear cover;
an adjustable support band;
a display system;
a computer system, wherein the computer system runs an operating system;
a communications system;
a power source;
the adjustable support band being connected to the enclosure of the first ear cover and the enclosure of the second ear cover;
the first screen bar being movably engaged with the annular screen rail of the first enclosure;
the second screen bar being movably engaged with the annular screen rail of the second enclosure;
the power source being electrically connected to the display system, the computer system and the communications system; and
the computer system being electronically connected to the communications system and the screen.

2. The headset with binary display and integrated computing system as claimed in claim 1 comprises:
the first ear cover and second ear cover each comprise an antenna;
the control interface comprises an input housing and an input device;
the antenna being rotatably connected to the enclosure adjacent to the annular screen rail;
the antenna traversing into the enclosure;
the input housing being recessed into the enclosure;
the input device being positioned in and attached to the input housing;
the speaker, antenna, and input device each being electrically connected to the power source; and
the speaker, antenna, and input device each being electronically connected to the computer system.

3. The headset with binary display and integrated computing system as claimed in claim 2 comprises:
a power button being positioned on the enclosure of the first ear cover adjacent to the input housing; and
the power button being electronically connected to the computer system and the screen.

4. The headset with binary display and integrated computing system as claimed in claim 1 comprises:
the set of connection ports being electrically connected to the power source; and
the set of connection ports being electronically connected to the computer system.

5. The headset with binary display and integrated computing system as claimed in claim 1 comprises:
the set of connection ports of the first ear cover comprises a first Universal Serial Bus (USB) input, a High-Definition Multimedia Interface (HDMI) input and an audio input; and
the set of connection ports of the second ear cover comprises a second USB input, an Ethernet input, a power port, and a Secure Digital (SD) card slot.

6. The headset with binary display and integrated computing system as claimed in claim 1 comprises:
the adjustable support band comprises a main section, a first end section, and a second end section;
the main section comprises a main rail;
the main rail laterally traversing through the main section;
the first end section being connected to the main section by the main rail;
the second end section being connected to the main section by the main rail opposite the first end section;
the first end section and the second end section each being slidably engaged with the main rail;
the first end of the adjustable support band being connected to the first ear cover; and
the second end of the adjustable support band being connected to the second ear cover.

7. The headset with binary display and integrated computing system as claimed in claim 1 comprises:
the display system comprises a first display device, a second display device, a webcam, and a microphone;
the first display device and the second display device each comprise a protective cover;
the protective cover of the first display device being attached across the first display device;
the protective cover of the second display device being attached across the second display device;
the webcam and the microphone each being positioned between the first display device and the second display device;
the power source being electrically connected to the first display device, the second display device, the webcam and the microphone; and
the computer system being electronically connected to the first display device, the second display device, the webcam and the microphone.

8. The headset with binary display and integrated computing system as claimed in claim 7 comprises:
the display system further comprises a concave interior face; and
the first display device, the second display device, the webcam, and the microphone being positioned on the concave interior face.

9. The headset with binary display and integrated computing system as claimed in claim 1 comprises:
the display system comprises a first hinge and a second hinge;
the first hinge being positioned adjacent to the screen end of the first screen bar; and
the second hinge being positioned adjacent to the screen end of the second screen bar.

10. The headset with binary display and integrated computing system as claimed in claim 1 comprises:
the display system comprises a first receptacle and a second receptacle;
the first receptacle and the second receptacle each comprise a locking mechanism;
the first screen bar traversing into the first receptacle;

the second screen bar receptacle traversing into the second receptacle;

the first screen bar being coupled with the first receptacle by the locking mechanism of the first receptacle; and the second screen bar being coupled with the second receptacle by the locking mechanism of the second receptacle.

11. The headset with binary display and integrated computing system as claimed in claim 1 comprises:

the computer system comprises a chipset, a non-volatile storage, and a volatile storage, wherein the operating system is stored on the non-volatile storage; and the computer system being housed within the pair of ear covers.

12. The headset with binary display and integrated computing system as claimed in claim 1 comprises:

the communications system comprises a wireless network adapter, a wireless display module, a Bluetooth module, a satellite transceiver, a cellular antenna, a mobile broadband module, and an Advanced Television Systems Committee (ATSC) receiver;

the communications system being housed within the pair of ear covers;

the ATSC receiver being electronically connected to the antenna of the first ear cover; and the satellite transceiver being electronically connected to the antenna of the second ear cover.

13. A headset with binary display and integrated computing system comprises:

a pair of ear covers comprises a first ear cover and a second ear cover;

the first ear cover and second ear cover each comprise an enclosure, an annular screen rail, a speaker, a control interface, and a set of connection ports;

the speaker being positioned on the enclosure opposite the control interface;

the annular screen rail being positioned on the enclosure between the speaker and the control interface;

the annular screen rail being positioned around the enclosure;

the set of connection ports being positioned on the enclosure adjacent to the annular screen rail around the enclosure;

the annular screen rail comprises a track and a guide slider;

the guide slider being movably engaged with the track;

a first screen bar and a second screen bar;

the first screen bar and the second screen bar each comprise a support end and a screen end;

the support end of the first screen bar being connected to the guide slider of the first ear cover;

the support end of the second screen bar being connected to the guide slider of the second ear cover;

an adjustable support band;

a display system;

the display system comprises a first display device, a second display device, a webcam, and a microphone;

the first display device and the second display device each comprise a protective cover;

a computer system, wherein the computer system runs an operating system;

a communications system;

a power source;

the adjustable support band being connected to the enclosure of the first ear cover and the enclosure of the second ear cover;

the first screen bar being movably engaged with the annular screen rail of the first enclosure;

the second screen bar being movably engaged with the annular screen rail of the second enclosure;

the power source being electrically connected to the display system, the computer system and the communications system;

the computer system being electronically connected to the communications system and the screen;

the set of connection ports being electrically connected to the power source; and the set of connection ports being electronically connected to the computer system.

14. The headset with binary display and integrated computing system as claimed in claim 13 comprises:

the first ear cover and second ear cover each comprise an antenna;

the control interface comprises an input housing and an input device;

the antenna being rotatably connected to the enclosure adjacent to the annular screen rail;

the antenna traversing into the enclosure;

the input housing being recessed into the enclosure;

the input device being positioned in and attached to the input housing;

the speaker, antenna, and input device each being electrically connected to the power source;

the speaker, antenna, and input device each being electronically connected to the computer system;

a power button being positioned on the enclosure of the first ear cover adjacent to the input housing; and the power button being electronically connected to the computer system and the screen.

15. The headset with binary display and integrated computing system as claimed in claim 13 comprises:

the set of connection ports of the first ear cover comprises a first Universal Serial Bus (USB) input, a High-Definition Multimedia Interface (HDMI) input and an audio input; and the set of connection ports of the second ear cover comprises a second USB input, an Ethernet input, a power port, and a Secure Digital (SD) card slot.

16. The headset with binary display and integrated computing system as claimed in claim 13 comprises:

the adjustable support band comprises a main section, a first end section, and a second end section;

the main section comprises a main rail;

the main rail laterally traversing through the main section;

the first end section being connected to the main section by the main rail;

the second end section being connected to the main section by the main rail opposite the first end section;

the first end section and the second end section each being slidably engaged with the main rail;

the first end of the adjustable support band being connected to the first ear cover; and the second end of the adjustable support band being connected to the second ear cover.

17. The headset with binary display and integrated computing system as claimed in claim 13 comprises:

the display system further comprises a concave interior face the protective cover of the first display device being attached across the first display device;

the protective cover of the second display device being attached across the second display device;

the webcam and the microphone each being positioned between the first display device and the second display device;

the power source being electrically connected to the first display device, the second display device, the webcam and the microphone;

the computer system being electronically connected to the first display device, the second display device, the webcam and the microphone; and the first display device, the second display device, the webcam, and the microphone being positioned on the concave interior face.

18. The headset with binary display and integrated computing system as claimed in claim 13 comprises:

the display system further comprises a first hinge and a second hinge;

the first hinge being positioned adjacent to the screen end of the first screen bar; and the second hinge being positioned adjacent to the screen end of the second screen bar.

19. The headset with binary display and integrated computing system as claimed in claim 13 comprises:

the display system comprises a first receptacle and a second receptacle;

the first receptacle and the second receptacle each comprise a locking mechanism;

the first screen bar traversing into the first receptacle;

the second screen bar receptacle traversing into the second receptacle;

the first screen bar being coupled with the first receptacle by the locking mechanism of the first receptacle; and the second screen bar being coupled with the second receptacle by the locking mechanism of the second receptacle.

20. The headset with binary display and integrated computing system as claimed in claim 13 comprises:

the computer system comprises a chipset, a non-volatile storage, and a volatile storage, wherein the operating system is stored on the non-volatile storage;

the computer system being housed within the pair of ear covers;

the communications system comprises a wireless network adapter, a wireless display module, a Bluetooth module, a satellite transceiver, a cellular antenna, a mobile broadband module, and an Advanced Television Systems Committee (ATSC) receiver;

the communications system being housed within the pair of ear covers;

the ATSC receiver being electronically connected to the antenna of the first ear cover; and the satellite transceiver being electronically connected to the antenna of the second ear cover.

* * * * *